Aug. 19, 1958     H. G. CORNEIL ET AL     2,848,519
PROCESS FOR RECOVERY OF HIGH PURITY HYDROCARBONS
Filed Sept. 6, 1955     3 Sheets-Sheet 1

INVENTORS.
Hampton G. Corneil,
Everett W. Lewis,
BY   John M. Powers

ATTORNEY.

INVENTORS.
Hampton G. Corneil,
Everett W. Lewis,
John M. Powers,
BY
ATTORNEY.

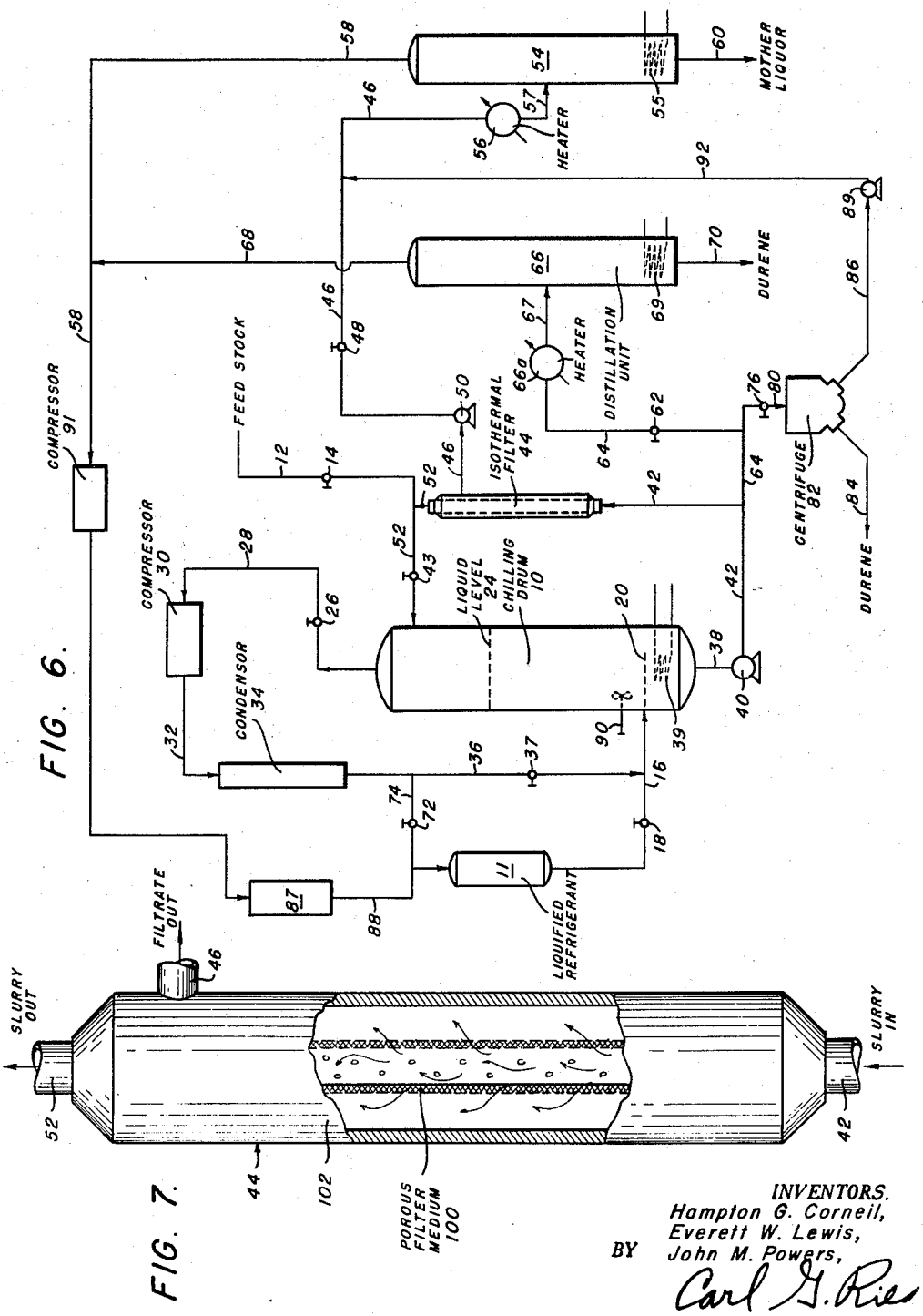

United States Patent Office 2,848,519
Patented Aug. 19, 1958

2,848,519

PROCESS FOR RECOVERY OF HIGH PURITY HYDROCARBONS

Hampton G. Corneil, Everett W. Lewis, and John M. Powers, Baytown, Tex., assignors, by mesne assignments, to Esso Research and Engineering Company, Elizabeth, N. J., a corporation of Delaware Application September 6, 1955, Serial No. 532,686

8 Claims. (Cl. 260—674)

This invention relates to a process for recovering a selected cyclic hydrocarbon in high purity from a mixture of cyclic hydrocarbons containing the same. More particularly, this invention relates to a fractional crystallization process for recovering a selected cyclic hydrocarbon from a mixture of cyclic hydrocarbons containing the selected hydrocarbon. The present invention still more particularly relates to a fractional crystallization process which may be used to particular advantage in recovering durene (1,2,4,5 tetramethyl benzene) from a durene-containing mixture of cyclic $C_{10}$ hydrocarbons.

The present invention may be briefly described as a process for recovering a selected cyclic hydrocarbon crystallizable at a temperature of about $-50°$ to about $-120°$ F. wherein a feed stock comprising a mixture of cyclic hydrocarbons containing the selected hydrocarbon is dissolved in about 0.5 to 1.5 volumes, per volume of feed stock (i. e., about 50 to 150 volume percent) of a liquefied, normally gaseous refrigerant in which the feed stock is soluble, wherein the resultant solution is chilled by autorefrigeration at a chilling rate of about 2° to about 15° F. per minute to a temperature of about $-50°$ to about $-120°$ F., said temperature being about the temperature of maximum selective crystallization of the said selected hydrocarbon, whereby there is formed a slurry of crystals of said selected compound in a liquid medium comprising liquefied refrigerant and mother liquor (i. e., uncrystallized components of the feed stock), wherein the thus-formed slurry is turbulently isothermally filtered to remove said liquid medium to an extent sufficient to provide for the removal of about 90 to about 99 volume percent of said mother liquor while maintaining an amount of liquefied refrigerant in said slurry sufficient to provide a slurry containing not more than about 70 weight percent of crystals, and wherein a product consisting of at least about 95 weight percent of said selected compound is recovered from the thus filtered slurry.

Representative cyclic hydrocarbons crystallizable at temperatures of about $-50°$ to about $-120°$ F. that may be recovered with satisfactory results in high purity in accordance with the present invention from cyclic hydrocarbon feed stocks containing the same are compounds such as durene, paraxylene, orthoxylene, cyclohexane, benzene, naphthalene, etc. It will be understood that the temperature to be used in a given situation will be, at least in part, dependent on the identity of the cyclic hydrocarbon to be recovered and the nature of the feed stock containing the same. By way of explanation, the solubility of a crystalline cyclic hydrocarbon in a liquid medium will tend to vary with temperature. Thus, when a solution of a cyclic hydrocarbon in a liquefied refrigerant is chilled to provide a slurry of crystals of the selected hydrocarbon in a liquid medium comprising mother liquor and liquefied refrigerant, it will normally be found that there is a temperature range within which a maximum amount of the selected compound will exist in crystalline form; above which potentially crystallizable material will remain in solution and below which it is normally not practical to go for economical reasons. This temperature range will not be the same for all cyclic hydrocarbons and will vary with the nature of the feed stock and the cyclic hydrocarbon to be recovered therefrom. It will be further understood that in accordance with the present invention the lowest temperature to be used will be a temperature within the range of about $-50°$ to about $-120°$ F. at which a maximized amount of the selected cyclic hydrocarbon will be selectively crystallized.

By way of example, a mixture of aromatic $C_8$ hydrocarbons consisting principally of ortho-, meta- and paraxylene and containing about 12 to 25 volume percent of paraxylene may be chilled in solution in a suitable liquefied refrigerant in accordance with the present invention to a temperature of about $-100°$ to about $-110°$ F. to provide a slurry containing about 5 to 20 volume percent of paraxylene crystals (based on the feed stock), such crystals ranging in diameter from about 20 to about 150 microns.

As another example, a naphthenic hydrocarbon fraction containing about 81 volume percent of cyclohexane may be chilled in solution in a liquefied refrigerant to a temperature of about $-60°$ to about $-80°$ F. to form a slurry containing about 11 volume percent of cyclohexane crystals; such crystals ranging in diameter from about 25 to 75 microns and having an average diameter of about 50 microns.

In similar fashion, an aromatic fraction containing about 25 volume percent of benzene may be chilled in solution to a temperature of about $-100°$ to about $-120°$ F. to provide a slurry containing about 4.1 volume percent of benzene crystals (based on the feed stock); a mixture consisting primarily of ortho- and metaxylene and containing about 45 volume percent of orthoxylene may be chilled in solution to a temperature of about $-85°$ to about $-100°$ F. to provide a slurry containing about 13 volume percent of orthoxylene crystals (based on the feed stock) and a hydrocarbon mixture containing about 15 volume percent of naphthalene may be chilled in solution to a temperature of about $-70°$ to about $-80°$ F. to provide a slurry containing about 10 volume percent of naphthalene crystals (based on the feed stock); such benzene, orthoxylene and naphthalene crystals having diameters of the same order as paraxylene and cyclohexane.

As has been indicated, the process of the present invention is used to particular advantage in recovering durene from durene-containing aromatic fractions, such as aromatic fractions boiling in the range of about 360° to 400° F. and, preferably, in the range of about 375° to about 395° F. Such fractions, which normally contain about 5 to 40 volume percent of durene may be obtained, for example, by the catalytic reforming of virgin naphtha fractions, by the catalytic cracking of gas oils, etc. Illustrative durene-containing feed stock fractions include a fraction boiling in the range of about 373° to 396° F. obtained from a catalytically reformed naphtha and containing about 15.8 weight percent of durene; a fraction boiling in the range of about 375° to 395° F. obtained from a catalytically reformed naphtha bottoms fraction and containing about 26.5 weight percent of durene; a fraction boiling in the range of about 370° to 400° F. obtained from catalytically cracking a gas oil and containing about 6.2 weight percent of durene; and a fraction boiling in the range of about 375° to 395° F. obtained from catalytically cracking a gas oil and containing about 10.3 weight percent of durene.

It has been discovered that the separation of durene from feed stocks of this nature presents special problems in that the durene crystals formed by chilling such feed stocks are exceedingly fine, having diameters in the range of about 5 to 30 microns under the best of conditions and that, moreover, such crystals have about the same specific gravity as the mother liquor. Moreover, the mother liquor by itself is excessively viscous at the necessarily low crystallization temperature that must be employed. Thus, at a temperature of about −50° F. the mother liquor will have a viscosity of about 10 centipoises and at −90° F. will have a viscosity of about 40 centipoises.

In accordance with the present invention it has been discovered that the problems encountered with respect to the recovery of durene by selective crystallization may be substantially overcome by diluting the feed stock with about 0.5 to 1.5 volumes per volume of feed stock of a liquefied, normally gaseous solvent refrigerant and slowly chilling the resultant solution to a temperature of about −50° to about −100° F. (preferably about −60° to about −80° F.) by autorefrigeration under substantially constant volume conditions, whereby there is obtained a slurry of durene crystals of maximized size (i. e., of about 5 to 30 microns average diameter) in a liquid medium comprising a mother liquor containing a minimized amount of uncrystallized durene and the liquefied refrigerant.

The liquefied, normally gaseous refrigerant to be used should be a refrigerant in which the feed stock is soluble at room temperature. Representative refrigerants of this nature include, for example, liquefied, normally gaseous petroleum hydrocarbons such as ethane, ethylene, propane, propylene, butanes, butylenes, and the like, and mixtures thereof. Among the other refrigerants that may be used are compounds such as methyl chloride, sulfur dioxide, and chlorinated hydrocarbons such as dichloroethane, dichloro-propane, and others of the Freon type, and the like. It is desirable to initially mix about 0.5 to 1.5 volumes of refrigerant with each volume of feed stock and, in accordance with a preferred embodiment of the present invention, a mixture of about equal volumes of feed stock and refrigerant is initially prepared. The refrigerant to be employed will be dependent, in part, on the temperature of selective crystallization to be employed and it will be understood that the liquefied refrigerant to be used in a given situation should have volatility characteristics such that liquefied refrigerant will be present at the particular crystallization temperature to be employed. Liquefied propane is a preferred refrigerant when the crystallization temperature is not lower than about −65° F. but for still lower temperatures (e. g., −65° to −120° F.) the preferred liquefied refrigerant is ethane, ethylene or a mixture thereof.

The thus prepared solution is chilled by autorefrigeration (i. e., by evaporation of the refrigerant) to a temperature within the range of about −50° to about −120° F. at a chilling rate of about 2° to 15° per minute. An example of a chilling rate which gives satisfactory results is a chilling rate of about 5° F. per minute. During the chilling step the refrigerant that is lost by evaporation is preferably replaced in order to provide a solution of substantially constant volume. However, this is not absolutely necessary and, if desired, none or only a part of the liquefied refrigerant need be replaced; provided, however, that sufficient liquefied refrigerant is present to maintain temperature control by autorefrigeration and to provide a pumpable slurry containing not more than about 70 weight percent of crystals. By chilling the solution in this fashion there is obtained a slurry of crystals in a liquid medium comprising mother liquor and liquefied refrigerant. The crystals content of such a slurry will normally be within the range of about 5 to 25 weight percent (based on the feed stock) or, stated differently, within the range of about 2 to 15 weight percent (based on the total amount of feed stock and refrigerant) when a substantially constant volume of liquefied refrigerant is maintained during the chilling step.

In accordance with a modified form of the present invention, the size of the crystals is still further increased by warming the crystalline slurry formed during the chilling step by about 20° to about 50° F. for from about 15 minutes to 1 hour. During this crystal growth step the smaller than average diameter crystals formed during the chilling step tend to dissolve in the liquid medium and to then recrystallize on pre-existent crystals whereby the average size of the crystals in the slurry is increased. If a warming step is employed, the slurry is again chilled to the desired temperature of maximum crystallization at the end of the crystal growth step.

The slurry formed in the above-described manner is then turbulently isothermally filtered to an extent sufficient to remove about 90 to 99 volume percent of the mother liquor under conditions to provide a slurry containing up to about 70 weight percent of cyclic hydrocarbon crystals and the crystals are then separated from the slurry liquid. It will be understood that the slurry will be maintained at about the temperature of maximized crystal formation during the turbulent isothermal filtration step.

The turbulent isothermal filtration step may be accomplished in a plurality of manners, depending, in part, upon the nature of the crystals recovery process to be employed. Thus, for example, the liquid medium removed by turbulent isothermal filtration may be replaced by an equal volume of liquefied refrigerant whereby a substantially constant volume of liquid medium will be maintained. This is continued until substantially all of the mother liquor (i. e., 95 to 99 volume percent) is removed. In this situation, the selected cyclic hydrocarbon may be recovered by volatilizing the liquefied refrigerant at the end of the filtration step whereby a purified cyclic hydrocarbon product is obtained. The slurry may, if desired, be filtered under conditions to form a filter cake fraction of high purity crystals and a filtrate fraction comprising the liquid medium.

Alternately, a constant volume of refrigerant or a constant ratio of refrigerant to mother liquor may be maintained during the turbulent isothermal filtration step whereby, at the end of the filtration step, there will be obtained a concentrated slurry from which the crystals may be recovered, for example, by centrifugal filtration to obtain high purity product.

The present invention will be further described by reference to the accompanying drawings wherein:

Fig. 6 is a diagrammatic flow sheet illustrating a preferred recovery process; and Fig. 7 is a schematic elevational view, partly in section, of a filter which may be used for turbulently isothermally filtering the slurry.

Figs. 1 to 6 will be described with reference to the recovery of durene from an aromatic hydrocarbon fraction containing primarily $C_{10}$ aromatic hydrocarbons. It will be understood, however, that other cyclic hydrocarbon feed stocks containing cyclic hydrocarbons which may be selectively crystallized with maximized crystal formation at temperatures in the range of about −50° to about −120° F. may be processed in a similar manner.

Figure 1:
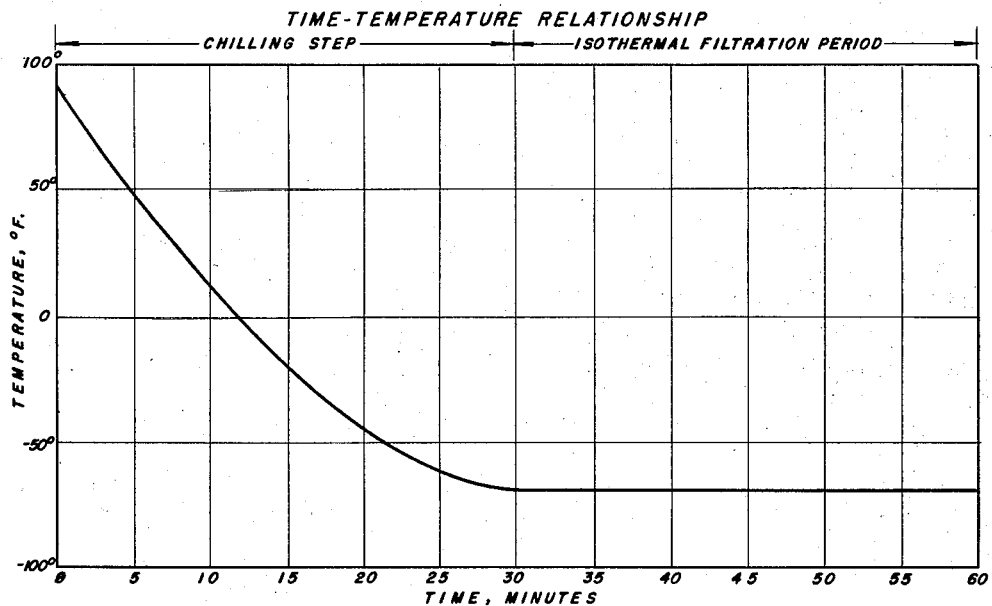
Figs. 1 and 2 are graphs representing time-temperature relationships which may be employed in chilling and filtering the feed stock-liquefied refrigerant solution in accordance with preferred embodiments of the present invention.

Fig. 1 shows a typical time-temperature relationship which may be employed for chilling a durene-containing feed stock-refrigerant solution and turbulently, isothermally filtering the slurry formed during the chilling step. In Fig. 1 it will be noted that the temperature of the solution is progressively reduced from an initial value of about 90° F. to a value of about −70° F. over a period of about 30 minutes and that the slurry that is formed as a result of the chilling step is then filtered in a desired manner over about a 30 minute period at this temperature.

Figure 2:
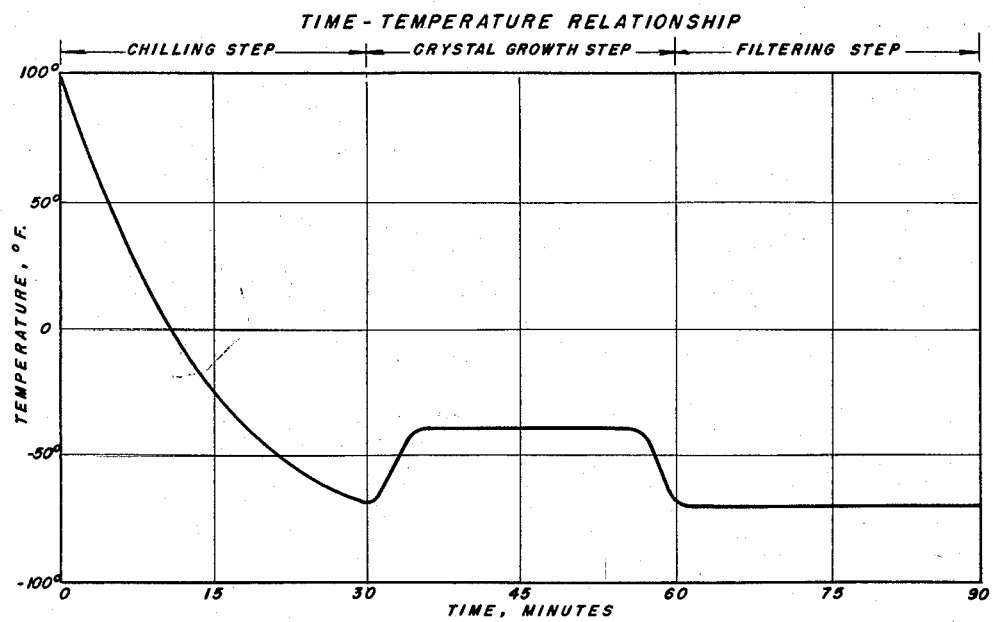

In Fig. 2 there is shown an example of time-temperature relationship that may be utilized when a crystal growth step is to be employed. From Fig. 2 it will be seen that the temperature of the feed stock-refrigerant solution is reduced from about 90° F. to about —70° F. over about a 30 minute period to form a slurry of durene crystals, that the thus formed slurry is then warmed to a temperature of about —40° F. over about a 5 minute period, held at this temperature for about 20 minutes, and then again chilled to a temperature of about —70° F. over about a 5 minute period. The slurry is then turbulently isothermally filtered over about a 30 minute period at about —70° F.

Figure 3:
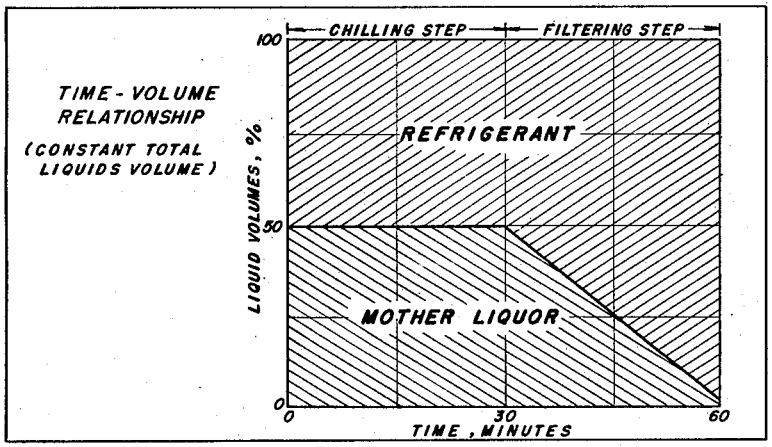
Figs. 3 to 5 are graphic representations of typical time-liquid composition relationships which may be employed in accordance with preferred embodiments of the present invention.
Figure 4:
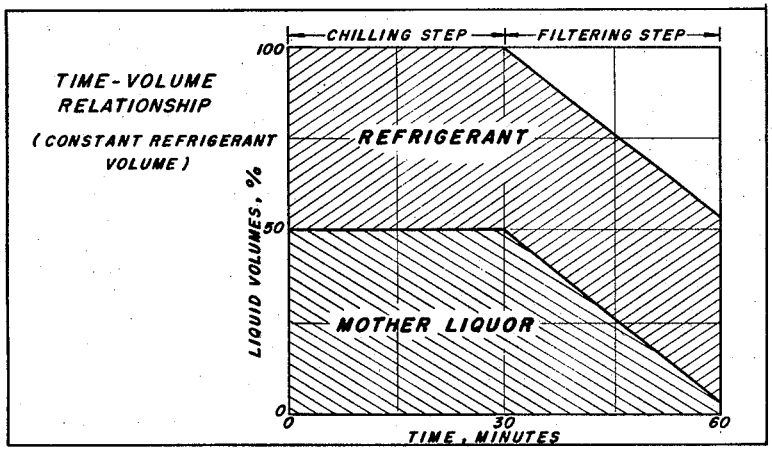
Figure 5:
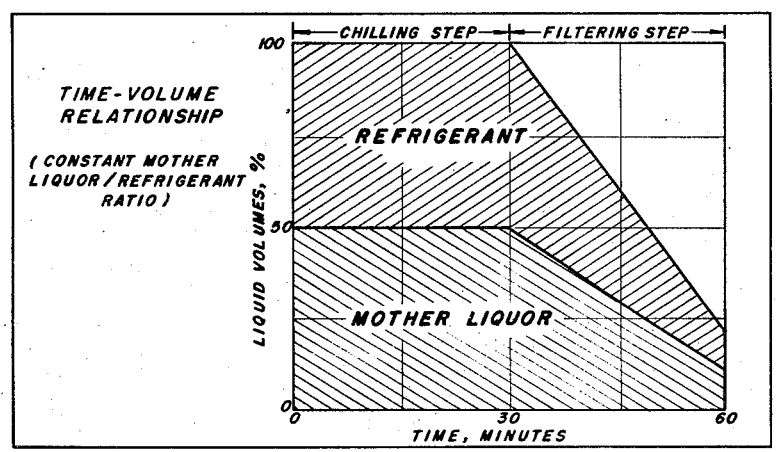

In Figs. 3 to 5 there are disclosed a variety of time-volume relationship cycles that may be employed in chilling the feed stock-refrigerant solution and in filtering the slurry formed during the chilling step.

In Fig. 3 there is disclosed a representative time-volume relationship that may be employed when a constant volume of liquid material is to be maintained throughout the chilling and filtering steps. In this situation it will be noted that a substantially constant volume of refrigerant is maintained during the chilling step and that thereafter during the turbulent isothermal filtration step the volume of refrigerant is progressively increased as mother liquor is removed due to withdrawal of the liquid medium as filtrate during the filtration operation, whereby there is provided at the end of a filtration step a slurry of about 2 to 15 weight percent of durene crystals in a liquid medium, such liquid medium comprising about 99 volume percent of refrigerant.

A representative time-volume relationship that may be used with satisfactory results when a constant volume of refrigerant is to be maintained in the liquid medium during the filtering step is shown in Fig. 4. With reference to Fig. 4 it will be noted that a substantially constant volume of refrigerant is maintained during both the chilling and filtering steps. It will be further noted that a substantially constant volume of mother liquor will be maintained during the chilling step and that the mother liquor will thereafter be progressively removed during the filtering step. At the end of the filtering step there is obtained a concentrated slurry containing, for example, about 5 to 30 weight percent of durene crystals in a liquid medium consisting primarily of refrigerant and containing, additionally, about 2 volume percent of mother liquor.

A still further time-volume relationship which may be employed with satisfactory results is shown in Fig. 5. In this instance, a substantially constant ratio of mother liquor to refrigerant is maintained. It will be noted that during the chilling step the volumes of refrigerant and mother liquor remain constant and that thereafter during the filtration step mother liquor and refrigerant are removed at equal rates by turbulent isothermal filtration in order to provide at the end of the filtration step a concentrated slurry containing, for example, about 50 to 70 percent of durene crystals. The liquid medium in this instance will comprise about equal volumes of refrigerant and mother liquor.

It will be understood that a wide variety of time-temperature and time-volume relationships may be employed and that the foregoing examples have been given by way of illustration only.

Turning now to Fig. 6, there is schematically disclosed a typical recovery process which will be described in connection with the recovery of durene.

A chilling drum 10 is provided and an overhead charge line 12 controlled by a valve 14 is used for the introduction of a suitable feed stock. There is also provided a refrigerant charge line 16 controlled by a valve 18 leading from a liquefied refrigerant storage tank 11 for introducing a liquefied, normally gaseous refrigerant such as ethane, ethylene, or a mixture thereof to a suitable distributing means 20 within the chilling drum 10. The distributing means 20 provides uniform distribution of refrigerant in the liquid contents of the chilling drum 10.

In accordance with one embodiment of the present invention the desired amounts of feed stock and refrigerant are charged to the chilling drum 10 through the charge lines 12 and 16, respectively, and thereafter the valves 14 and 18 are closed. As a result, there is provided a mixture of refrigerant and feed stock partially filling the chilling drum up to, for example, the liquid level line 24.

The thus formed mixture is then slowly chilled at the rate of about 2° to 15° F. per minute by auto-refrigeration while the contents of the tank are mixed by mixer 90. This is accomplished, for example, by regulation of a control valve 26 in a vaporizing refrigerant discharge line 28 leading to a compressor 30, whereby the refrigerant in the chilling drum 10 may be evaporated at a rate to provide for proper chilling of the liquid material. Vaporized refrigerant is compressed in the compressor 30, which may be of any suitable construction, and the compressed material is passed therefrom through a line 32 to a condenser 34 of any suitable construction wherein the compressed material is liquefied. The thus liquefied material is recycled to the charge line 16 through a line 36 controlled by a valve 37, whereby a desired (e. g., constant) volume of liquid material is maintained in the chilling drum 10.

The material in the chilling drum 10 is cooled in this fashion to a desired temperature (e. g., a temperature within the range of about —50° to about —120° F. and preferably about —60° to about —80° F.) whereby there is formed a slurry of durene crystals having an average diameter of at least about 5 microns in a liquid medium consisting of mother liquor (uncrystallized feed stock components) and liquefied refrigerant.

As has been indicated, the thus formed slurry may next be turbulently isothermally filtered or, prior to the filtration step, may be warmed 20° to 50° F. to a temperature of about —50° to about —25° F. by means of heater 39 to promote the growth of the durene crystals. If the crystal growth step is to be employed the slurry is again chilled to the initially used low temperature within the range of about —50° to about —100° F. after the crystal growth step and before filtration; the rechilling being accomplished by autorefrigeration in the described manner.

The chilled slurry is next turbulently isothermally filtered in order to remove from about 90 to 99 volume percent of the mother liquor initially present in the slurry. This may be accomplished, for example, in the following manner:

The slurry is withdrawn from the chilling drum 10 through a line 38 leading to a pump 40; the pump 40 having a discharge line 42 leading to an isothermal filtration unit 44 of any suitable construction provided with a filtrate removal line 46 wherein the slurry may be turbulently isothermally filtered in a manner to be more completely described. During the turbulent isothermal filtration step the crystals containing portion of the slurry is returned to the chilling drum 10 through a recycle line 52 controlled by valve 43.

The turbulently isothermally obtained filtrate is charged to a suitable fractionating zone wherein temperature and/or pressure is adjusted so as to volatilize the refrigerant for separation from the mother liquor. Thus, for example, the filtrate may be charged by the line 46 to a suitable heater 56 and thence, by way of a line 57 to a distillation unit 54 provided with suitable temperature and pressure control means such as a steam coil 55. Vaporized refrigerant is taken overhead from the distillation unit through an overheads discharge line 58 and the mother liquor is discharged through a bottoms line 60, During the turbulent isothermal filtration step a substantially constant volume of liquid material may be maintained in the chilling drum 10 or, alternatively, the liquid volume may be reduced in a manner to be described whereby a concentrated slurry of durene crystals is obtained.

It has been indicated that the filtrate removed during the turbulent isothermal filtration step is fractionated in the distillation or equivalent type unit 54 to provide a mother liquor fraction and a vaporized overhead fraction discharged through the line 58. The manner in which the vaporized refrigerant is to be processed is dependent, in part, upon the volume of liquid to be maintained in the chilling drum 10 and on the composition of such liquid. Thus, if a substantially constant volume of liquid material is to be maintained in the chilling drum 10, the vaporized refrigerant may be passed by the line 28 to the compressor 30 for compression. The compressed refrigerant is then passed to the condenser 34 through the line 32 for liquefaction and the liquefied refrigerant is then fed by way of the line 36 to the liquefied refrigerant charge line 16. At the same time, an additional quantity of liquefied refrigerant, corresponding to the total volume of liquid withdrawn through the filter, is charged to the chilling drum 10 from the refrigerants storage tank 11 by opening valve 18, whereby a substantially constant volume of liquid is maintained in the chilling drum 10.

If the volume of liquefied refrigerant in the chilling drum 10 is to be held at a substantially constant value during the filtration step, the vaporized refrigerant taken overhead by the line 28 is compressed in the compressor 30, liquefied in the condenser 34 and recycled to the chilling drum 10 through the line 16 in the indicated manner. In this instance, however, the volume of fresh refrigerant that must be added from tank 11 through valve 18 corresponds to only the refrigerant content of the liquid withdrawn from the filter through line 46.

If the filtration step is to be conducted in a manner to provide for a reduced volume of liquids in the chilling drum 10 with a substantially constant ratio of refrigerant to mother liquor, the vaporized refrigerant taken overhead by line 28 is compressed in the compressor 30, liquefied in condenser 34 and recycled to the chilling drum 10 through lines 36 and 16. No liquefied refrigerant is added to or removed from storage tank 11. Thus, a constant ratio of mother liquor to refrigerant is maintained in the chilling drum 10.

When the desired amount of mother liquor has been removed, the durene crystals are separated from the remaining liquid material.

As an example, a substantially constant volume of liquid material may be maintained in the chilling drum 10 during the turbulent isothermal filtration step whereby, at the end of the filtration step, the liquid material will consist essentially of liquefied refrigerant. Thus, for example, the liquid material may consist of up to about 99 volume percent of liquefied refrigerant. In order to separate the durene crystals from the liquefied refrigerant, the valve 43 in the filtrate line 52 may be closed and a valve 62 in a line 64 leading to a suitable distillation or equivalent type unit may be opened. As a consequence, the slurry will be charged to a suitable heater 66a for melting the durene crystals and then charged by a line 67 to a distillation unit 66 provided with suitable temperature and/or pressure control means such as a steam coil 69. Refrigerant is removed in vapor form from the distillation unit 66 through a line 68 by adjustment of temperature and/or pressure by means of heating illustrated by the steam coil 69 and a product consisting of at least about 95 weight percent (e. g., about 99+ weight percent) of durene is discharged through a line 70. Compressor 91 removes vapor and increases pressure so that the refrigerant vapor may be condensed in condenser 87. However, the pressure on the distillation unit 66 is preferably maintained high enough to permit the durene present in the bottom of the distillation unit to be a liquid. The vaporized refrigerant discharged from the distillation unit 66 through the line 68 is added to the vaporized refrigerant flowing in line 58 from the mother liquor distillation unit 54. The combined refrigerant vapor streams are then compressed by compressor 91, liquefied in condenser 87, and returned to liquefied refrigerant storage tank 11. As has been previously mentioned, the liquefied refrigerant discharged from the compressor 30, through the condenser 34 and line 36 may be routed to the storage zone 11 for re-use by closing the valve 37 in the recycle line 36 and opening valve 72 in a line 74 leading to the storage zone 11 or it may be returned to chilling drum 10 by flowing through line 36 and valve 37.

As another example, during the turbulent isothermal filtration step the contents of the chilling drum may be reduced in volume, the reduction in volume being accomplished in a manner to provide a substantially constant volume of liquefied refrigerant. In this situation, at the end of the filtration step there is provided a concentrated slurry of durene crystals in a liquid medium; the liquid medium consisting, for example, of about 95 to 99 volume percent of liquid refrigerant and the slurry, as a whole, containing about 5 to 30 weight percent of durene crystals, based on the total amount of material present. Again, the concentrated slurry may be discharged from the chilling drum 10 through the line 38 to the pump 40 and thence by way of lines 42 and 64, to the distillation unit 66. The refrigerant is removed in the distillation unit 66 in the indicated manner, gaseous refrigerant being removed overhead through the line 68 and a product consisting of at least about 95 weight percent of durene being discharged through line 70. As mentioned previously, the gaseous refrigerant discharged through the line 68 may be passed by way of line 58 to the compressor 91 and the condenser 87 for liquefaction; the liquefied refrigerant being returned to the storage tank 11 through line 88.

As another alternative, the valve 62 in the line 64 may be closed and a valve 76 controlling line 80 may be opened whereby the concentrated slurry from the chilling drum 10 will be charged by way of the lines 38, 42, 64 and 80 to a suitable filtration means such as a basket type centrifuge 82 wherein the durene crystals may be separated from any remaining liquid material by centrifugation. A filter cake consisting of at least about 95 weight percent of durene is discharged from the centrifuge 82 as product by way of a conduit 84 and the filtrate is discharged from the centrifuge 82 by way of a line 86. If desired, the line 86 may be connected to pump 89 which discharges to line 92 into line 46 leading to the distillation unit 54, whereby the filtrate may be separated into a mother liquor fraction discharged through the bottoms line 60 and a vaporized refrigerant fraction discharged overhead through a line 58 to the compressor 91, condenser 87, line 88 and refrigerant storage tank 11.

In accordance with a still further embodiment of the present invention, the turbulent isothermal filtration operation is conducted in a manner to provide for a reduced volume of liquids in the chilling drum with a substantially constant ratio of mother liquor to liquefied refrigerant. In this situation, there is obtained as a result of the filtration step a concentrated slurry containing, for example, about 50 to 70 weight percent of durene crystals (based on the total volume of material) in a liquid material containing about equal volumes of mother liquor and liquefied refrigerant. In this situation, the concentrated slurry may be passed from the chilling drum 10 by way of the line 38 to the pump 40 and thence by way of lines 42, 64 and 80 to the basket type centrifuge 82. In the centrifuge 82 the slurry is separated into a filter cake fraction and a filtrate fraction; the filter cake fraction containing at least about 95 weight percent of durene and being discharged by way of the conduit 84, and the filtrate being discharged by way of the line 86. The filtrate may be separated into a mother liquor fraction and a gaseous refrigerant fraction in the distillation unit 54 in the indicated manner and the gaseous refrigerant fraction may, as described, be condensed and returned to refrigerant storage tank 11.

While the process of the present invention has been described above with respect to batchwise recovery of a selected cyclic hydrocarbon such as durene, it will be understood that a continuous or semi-continuous recovery system may also be employed if desired wherein, for example, a plurality of chilling drums similar to the chilling drum 10 are provided, whereby through integration of the charging, chilling, turbulent isothermal filtration and crystallized compound recovery steps for the plurality of drums, a continuous or semi-continuous stream of feed stock may be fed to the recovery system and a continuous or semi-continuous stream of high purity cyclic hydrocarbon product withdrawn therefrom.

In the foregoing discussion mention has been made of an isothermal filter 44 to be used in turbulently isothermally filtering the slurry of durene crystals. Such a filter is schematically shown in greater detail in Fig. 7. With reference to Fig. 7 it is seen that the isothermal filter 44 comprises an inlet line 42 and a discharge line 52 terminally enclosed by a hollow casing member 102 having a discharge line 46. A filter member 100 within the casing 102 interconnects the lines 42 and 52 in fluid tight relationship and may be formed of any suitable material such as stoneware, fritted glass, screen wire, powdered metal, woven and sintered wire, filter cloth (such as a nylon filter cloth), etc. The size of the openings in the filter member 100 will have an important bearing on the material to be employed. When particularly fine openings are desired, it is preferable to employ a metallic filter medium such as sintered metal, sintered metal screen, etc.

The openings in the filter member 100 should be of a size such that no more than a minor portion of the smallest diameter selected cyclic hydrocarbon crystals will pass therethrough. Thus, the identity of the cyclic compound to be recovered will have an important bearing on opening size. For example, when the cyclic compound is paraxylene, cyclohexane, benzene, naphthalene, orthoxylene, etc. the opening could be as large as about 20 microns. However, if durene is to be recovered, it it preferable that the openings have a maximum diameter of about 5 microns.

In operation, slurry is passed from the line 42 through the filter member 100 under condtions of turbulent flow. While passing through the filter member 100, a portion of the liquid medium will pass through openings therein and into the casing 102 for discharge through the conduit 46. The remaining portion of the slurry will pass through the filter 44 for discharge through the outlet line 52. A suitable porous filter member 100 for use in the isothermal filter 44 may have a diameter of, for example, about 0.5 to 6 inches and a length to diameter ratio of from about 5 to 1 to about 30 to 1.

It will be apparent that if turbulent flow is to be maintained throughout the entire length of the isothermal filter 44 it is necessary that the amount of filtrate removed be less than the total amount of liquid material fed thereto. Thus, from about 0.01% to about 50% of the liquid may be removed by the isothermal filter 44, depending upon the concentration of the slurry and the rate of flow.

Having thus described our invention, what is claimed is:

1. A process for recovering durene from an aromatic feed stock boiling within the range from about 360° to about 400° F. and containing from about 5 to 40 percent durene, said process comprising the steps of dissolving said feed stock in about 0.5 to about 1.5 volumes per volume of feed stock of a liquefied normally gaseous refrigerant comprising a solvent for said feed stock, chilling the resultant solution by autorefrigeration in a crystallization zone to a temperature of maximized crystal formation within the range of about —50° to about —100° F. to form a slurry of crystals of said durene in a liquid medium consisting of a liquefied refrigerant and mother liquor, next continuously cycling a turbulently flowing stream of said slurry from said crystallization zone to an isothermal filtration zone to turbulently isothermally separate said stream into a filtrate fraction and a concentrated slurry fraction, continuously discarding said filtrate fraction, continuously returning said concentrated slurry fraction to said crystallization zone, continuing said cycling operation for a period of time sufficient to remove at least about 90 volume percent of said mother liquor from said slurry while providing an amount of said liquefied refrigerant sufficient to provide a slurry in said crystallization zone containing not more than about 70 weight percent of crystals and then separating said crystallized durene from said slurry whereby said durene is recovered as a product having a purity of at least about 95 weight percent.

2. A process as in claim 1 wherein said feed stock is an aromatic fraction boiling in the range between about 375° and about 395° F., and wherein said solution is chilled to a temperature within the range of about —60° to about —80° F.

3. A process for the recovery of high purity durene which comprises mixing a durene-containing aromatic hydrocarbon feed stock boiling within the range of about 360° to 400° F. with about 0.5 to about 1.5 volume per volume of feed stock of a liquefied normally gaseous refrigerant in which said feed stock is soluble, chilling the resultant solution by autorefrigeration at the rate of about 2° to about 15° per minute to a temperature within the range of about —60° to about —80° F. while maintaining a substantially constant volume of solution in order to form a slurry of crystallized durene in a liquid medium consisting essentially of liquefied refrigerant and mother liquor, next maintaining said slurry at said temperature while continuously cycling a turbulently flowing stream of said slurry from said crystallization zone to an isothermal filtration zone to turbulently isothermally separate said stream into a filtrate fraction and a concentrated slurry fraction, continuously discarding said filtrate fraction, continuously returning said concentrated slurry fraction to said crystallization zone, continuing said cycling operation for a period of time sufficient to remove at least about 90 volume percent of said mother liquor from said slurry while providing an amount of liquefied refrigerant sufficient to provide a slurry containing not more than about 70 weight percent of durene crystals and then recovering said crystallized durene from said slurry as a product whereby said durene product will conatin at least about 95 weight percent of durene.

4. A process as in claim 3 wherein liquefied refrigerant is added to said slurry during said cycling operation in an amount sufficient to provide a slurry having a substantially constant volume of liquids.

5. A process as in claim 3 wherein liquefied refrigerant is added to said slurry during said cycling operation in an amount sufficient to provide a slurry having a substantially constant volume of said refrigerant.

6. A process as in claim 3 wherein liquefied refrigerant is added to said slurry during said cycling operation in an amount sufficient to provide a slurry having a substantially constant ratio of mother liquor to refrigerant.

7. A process for the recovery of high purity durene which comprises mixing a durene-containing aromatic hydrocarbon feed stock boiling within the range of about 360° to 440° F. with about 0.5 to about 1.5 volumes per volume of feed stock of a liquefied normally gaseous refrigerant in which said feed stock is soluble, chilling the resultant solution by autorefrigeration at the rate of about 2° to about 15° per minute to a temperature within the range of about —60° to about —80° F. while maintaining a substantially constant volume of solution in order to form a slurry of crystallized durene in a liquid medium consisting essentially of liquefied refrigerant and mother liquor, then warming said slurry to a temperature within the range of about —50° to about —30° F. for a period of time within the range of about 15 minutes to 1 hour, again chilling said slurry to a temperature within the range of about —60° to —80° F., next continuously cycling a turbulently flowing stream of said slurry from said crystallization zone to an isothermal filtration zone to turbulently isothermally separate said stream into a filtrate fraction and a concentrated slurry fraction, continuously discarding said filtrate fraction, continuously returning said concentrated slurry fraction to said crystallization zone, continuing said cycling operation for a period of time sufficient to remove at least about 90 volume percent of said mother liquor from said slurry while providing an amount of liquefied refrigerant sufficient to provide a slurry containing not more than about 70 weight percent of durene crystals and then recovering said crystallized durene from said slurry as a product whereby said durene product will contain at least about 95 weight percent of durene.

8. A process as in claim 7 wherein the amount of liquid refrigerant provided during said cycling operation is such that the slurry at the end of said cycling operation will contain from about 50 to 70 weight percent of durene crystals.

References Cited in the file of this patent

UNITED STATES PATENTS

| | | |
|---|---|---|
| 2,163,581 | Boyd | June 27, 1939 |
| 2,540,977 | Arnold | Feb. 6, 1951 |
| 2,665,316 | Bennett | Jan. 6, 1954 |
| 2,683,178 | Findlay | July 6, 1954 |